US008020522B2

(12) United States Patent
Martin et al.

(10) Patent No.: US 8,020,522 B2
(45) Date of Patent: Sep. 20, 2011

(54) CIRCUIT AND METHOD FOR CHECKING THE IMPEDANCE OF ELECTRODES AND FOR CONTROLLING THE INTENSITY OF AN ELECTRIC STIMULUS

(75) Inventors: Charles Martin, Lantin (BE); Fabrice Frebel, Wandre (BE)

(73) Assignee: Charles Martin, Lantin (BE)

( * ) Notice: Subject to any disclaimer, the term of this patent is extended or adjusted under 35 U.S.C. 154(b) by 136 days.

(21) Appl. No.: 12/044,670

(22) Filed: Mar. 7, 2008

(65) Prior Publication Data
US 2008/0216766 A1    Sep. 11, 2008

(30) Foreign Application Priority Data
Mar. 7, 2007    (EP) .................................... 07447016

(51) Int. Cl.
    *A01K 15/02*    (2006.01)
(52) U.S. Cl. ....................... 119/720; 119/859
(58) Field of Classification Search ......... 119/718–721, 119/856, 859, 908; 323/911; 324/117 R; 363/21.12, 21.17–21.18, 97, 131
See application file for complete search history.

(56) References Cited

U.S. PATENT DOCUMENTS

| | | | | |
|---|---|---|---|---|
| 2,800,104 | A * | 7/1957 | Cameron et al. | 119/720 |
| 2,978,690 | A * | 4/1961 | Kurie et al. | 33/715 |
| 3,221,241 | A * | 11/1965 | Greenberg et al. | 363/86 |
| 3,472,216 | A * | 10/1969 | Clyborne | 123/613 |
| 3,589,337 | A * | 6/1971 | Doss | 119/720 |
| 3,608,524 | A * | 9/1971 | Waltz | 119/718 |
| 3,673,487 | A * | 6/1972 | Hendrickson | 363/89 |
| 3,673,567 | A * | 6/1972 | McClellan, Sr. | 119/718 |
| 4,095,163 | A * | 6/1978 | Montague | 323/231 |
| 4,446,841 | A * | 5/1984 | Van Siclen, Jr. | 123/406.57 |
| 4,539,937 | A * | 9/1985 | Workman | 119/821 |
| 4,802,482 | A * | 2/1989 | Gonda et al. | 119/720 |
| 4,819,197 | A * | 4/1989 | Blais | 708/207 |
| 4,996,945 | A * | 3/1991 | Dix, Jr. | 119/721 |
| 5,425,330 | A | 6/1995 | Touchton et al. | |
| 5,461,223 | A * | 10/1995 | Butturini et al. | 235/462.27 |
| 5,584,262 | A * | 12/1996 | Schultz | 119/14.28 |
| 5,666,908 | A * | 9/1997 | So | 119/720 |

(Continued)

FOREIGN PATENT DOCUMENTS
AU    2005100421 A4    6/2005

OTHER PUBLICATIONS

European Search Report, Application No. EP07447016.2, 2 pages.

*Primary Examiner* — Rob Swiatek
*Assistant Examiner* — Ebony Evans
(74) *Attorney, Agent, or Firm* — Knobbe Martens Olson & Bear LLP

(57) ABSTRACT

A remote receiving circuit for providing and controlling an electric stimulus applied to an animal including an electronic switch powered by a battery in series on a primary of a high-voltage transformer and whose on/off state can be modified by control pulses to create a source of alternating current to supply the primary of the transformer. The circuit further includes a first electrode and a second electrode configured to be in contact with the animal and connected to the respective ends of a secondary of the transformer, and a device for measuring the peak intensity of a stimulus current applied by the electrodes to the animal's body.

19 Claims, 3 Drawing Sheets

U.S. PATENT DOCUMENTS

| | | | |
|---|---|---|---|
| 5,733,313 A * | 3/1998 | Barreras et al. | 607/33 |
| 5,905,623 A * | 5/1999 | McCartney | 361/119 |
| 5,927,233 A * | 7/1999 | Mainini et al. | 119/718 |
| 6,019,066 A * | 2/2000 | Taylor | 119/720 |
| 6,327,999 B1 | 12/2001 | Gerig | |
| 6,459,378 B2 * | 10/2002 | Gerig | 340/573.3 |
| 6,813,309 B1 * | 11/2004 | Ogino | 375/148 |
| 6,923,147 B1 * | 8/2005 | Davis | 119/721 |
| 7,245,470 B2 * | 7/2007 | Hoopes | 361/91.1 |
| 7,425,835 B2 * | 9/2008 | Eisele | 324/663 |
| 7,554,341 B2 * | 6/2009 | Eisele | 324/682 |
| 7,805,200 B2 * | 9/2010 | Kast et al. | 607/61 |
| 2002/0050249 A1 * | 5/2002 | Grimsley et al. | 119/721 |
| 2002/0079909 A1 | 6/2002 | Reeves | |
| 2003/0116101 A1 * | 6/2003 | Kim et al. | 119/720 |
| 2003/0193400 A1 * | 10/2003 | Grasselli et al. | 340/650 |
| 2004/0257842 A1 * | 12/2004 | Hui et al. | 363/97 |
| 2005/0073294 A1 * | 4/2005 | Baxter et al. | 324/117 R |
| 2005/0145201 A1 * | 7/2005 | Gillis et al. | 119/720 |
| 2005/0172912 A1 * | 8/2005 | Crist et al. | 119/720 |
| 2005/0217606 A1 * | 10/2005 | Lee et al. | 119/720 |
| 2006/0169222 A1 | 8/2006 | Gerig | |
| 2006/0192550 A1 * | 8/2006 | Sandquist et al. | 324/117 R |
| 2007/0221139 A1 * | 9/2007 | Reinhart | 119/720 |

* cited by examiner

CIRCUIT AND METHOD FOR CHECKING THE IMPEDANCE OF ELECTRODES AND FOR CONTROLLING THE INTENSITY OF AN ELECTRIC STIMULUS

RELATED APPLICATION

This application claims priority under 35 U.S.C. §119 to EP 07447016.2 filed Mar. 7, 2007, which is hereby incorporated by reference in its entirety.

BACKGROUND OF THE INVENTION

1. Field of the Invention

The present invention relates to a circuit for controlling an electric stimulus applied to an animal. In this type of system, the stimulus is usually generated by means of a collar attached to the animal's neck. The collar is typically remotely controlled by means of a radio frequency remote control. The intensity of the stimulus is variable, which allows to train the animal. The method for implementing the circuit is also detailed.

2. Description of the Related Technology

The use of electric stimuli is common in the context of animal training, and in particular that of dogs. The stimulus is applied by means of two electrodes in contact with the animal's skin and to which a high potential difference is applied.

Although it is very effective, the method has two drawbacks:

- if the electrodes are not in sufficient contact with the skin because the animal's coat is obstructing, it is not possible to correctly apply the stimulus;
- if, on the other hand, the electrodes are in perfect contact with the skin and the coat is damp, the stimulus is then too powerful and hurts the animal, which is not the aim sought.

Analyzing the state of the art shows that there may be in particular a circuit and an associated method for solving the first above-mentioned problem (see document U.S. Pat. No. 6,327,999 B1). The method consists in measuring the voltage present at the electrode terminals when the stimulus is applied. If the voltage is lower than a given threshold during the application of this stimulus, the system deduces that a non-infinite impedance is connected between the electrodes and thus that the contact of the electrodes is good. If, on the other hand, the voltage is greater than that given threshold, the contact of the electrodes is considered defective.

The major drawback of this technique is that the contact of the electrodes can only be measured when the stimulus is applied. In fact, it would be more useful to check the contact of the electrodes before applying the stimulus.

The second point above has however not been resolved, also in view of the other known documents from the state of the art.

Thus, American patent U.S. Pat. No. 5,666,908 may disclose a training collar wherein a radio transmitter is used in conjunction with a microprocessor receiver incorporated into the collar for improved control of the level of the electric stimulation applied to the animal through the electrodes. A control signal including the stimulation level codes is transmitted to the receiver and the microprocessor generates series of voltage pulses whose width is determined by the stimulation level code. The generated series of pulses controls the current circulating in the transformer power circuit generating the stimulus. The peak-to-peak amplitude of the voltage pulses applied to the electrodes is determined by the width of the voltage pulses in the generated series of pulses. The number of different stimulation levels for a given voltage interval is only limited by the number of bits used to specify the above-mentioned code, which gives better control over increments in the level of stimulation applied to the animal.

American patent U.S. Pat. No. 6,170,439 B1 may disclose a training device comprising a remote transmitter and a receiver incorporated into a collar worn by an animal, in which several stimulation levels may be selected at the level of the transmitter. The information representing the desired stimulation level is transmitted to the receiver and demodulated to produce a digital signal. The microprocessor located in the receiver generates as an output a first series of pulses of constant length and with a frequency representing the selected stimulation level. This first series is filtered to produce a second series of pulses whose width represents the selected stimulation level. This second series of pulses is applied to the control electrode of the switch linked to the transformer that generates the high-voltage pulses forming the stimulus and whose intensity corresponds to the width of the pulses of the above-mentioned second series. Thus, the amplitudes of the high-voltage pulses applied to the contact electrodes represent the selected stimulation level.

American patent U.S. Pat. No. 6,184,790 B1 may disclose a device that is similar to the preceding ones, with a transformer for generating high-voltage pulses with low output impedance.

SUMMARY

The circuit and method described herein solves both above-mentioned problems by means of an electronic circuit and of an operation algorithm for this circuit. In one embodiment, there is a remote receiving circuit to provide and control an electric stimulus applied to an animal comprising an electronic switch powered by a battery in series on a primary of a high-voltage transformer and whose on/off state can be modified by control pulses in such a way to create a source of alternating current for feeding a primary of the transformer, a first electrode and a second electrode configured so as to be in contact with the animal and linked to the respective ends of a secondary of the transformer, and a device for measuring a peak intensity of a stimulus current applied by the electrodes to the animal's body.

Measuring this peak current then allows adjusting the intensity of the stimulus applied to the animal to this measurement.

In another embodiment, there is a device for providing and remotely controlling an electric stimulus applied to an animal, the device comprising a radio frequency transmitter configured to remotely emit a signal, and the above-mentioned receiving circuit, configured to receive the signal and to provide and control the stimulus depending on the signal received.

In another embodiment, there is a method (algorithm) for implementing the above-mentioned circuit so as to measure the quality of contact between the electrodes and the animal's skin, with the following stages:

1. a control signal is applied to the electronic switch with a cyclic ratio of 1%;
2. the voltage of the measurement signal $V_{MEASUREMENT}$ is measured by means of an analogue-digital converter; if $V_{MEASUREMENT}$ is greater than a predetermined value $V_{THRESHOLD}$, go to stage 3; if not, if the cyclic ratio is lower than 20%, the cyclic ratio is increased by 1% and stage 2 is resumed; otherwise, go to stage 4;
3. the generation of the control signal is stopped and the contact of the electrodes is declared good; go to stage 5;

4. the generation of the control signal is stopped and the contact of the electrodes is declared insufficient; go to stage 5;
5. after a 5-second wait, return to stage 1.

In another embodiment, there is a method for regulating the cyclic ratio of the pulses for controlling the above-mentioned circuit, with the following stages:
1. the control signal is generated with a cyclic ratio of 1%;
2. the voltage of the measurement signal $V_{MEASUREMENT}$ is measured and $I_{STIMULUS,\ PEAK}$ is deduced from this by the equation:

$$V_{MEASUREMENT} = I_{STIMULUS,\ PEAK} * R1 * R3/(R2+R3);$$

3. if $I_{STIMULUS,\ PEAK}$ is lower than a desired set level, the cyclic ratio is increased and you return to stage 2; if not, the cyclic ratio is reduced and you return to stage 2.

In another embodiment, there is a computer usable medium having computer readable program code embodied therein for measuring a quality of contact of electrodes with an animal's skin, the computer readable code comprising instructions for a) applying a control signal to an electronic switch with a cyclic ratio of 1%; b) measuring a voltage of the measurement signal $V_{MEASUREMENT}$ with an analog-digital converter; c) if $V_{MEASUREMENT}$ is greater than a predetermined value $V_{THRESHOLD}$, stopping generation of the control signal; d) declaring contact of the electrodes to be good; e) after a predetermined wait, returning to a); f) if $V_{MEASUREMENT}$ is not greater than the predetermined value $V_{THRESHOLD}$, determining if the cyclic ratio is lower than 20%; g) if the cyclic ratio is lower than 20%, increasing the cyclic ratio by 1% and resuming to b); h) if the cyclic ratio is not lower than 20%, stopping generation of the control signal; i) declaring contact of the electrodes to be insufficient; and j) after the predetermined wait, returning to a). The program code can be run on a microcontroller.

In yet another embodiment, there is a computer usable medium having computer readable program code embodied therein for regulating a cyclic ratio of control pulses to control an electric stimulus applied to an animal, the computer readable code comprising instructions for a) generating a control signal with a cyclic ratio of 1%; b) measuring a voltage of a measurement signal $V_{MEASUREMENT}$; c) deducing $I_{STIMULUS,\ PEAK}$ with the equation: $V_{MEASUREMENT} = I_{STIMULUS, PEAK} * R1 * R3/(R2+R3)$; and d) if $I_{STIMULUS}$ PEAK is lower than a desired set level, increasing the cyclic ratio and resuming b); or e) if $I_{STIMULUS, PEAK}$ is not lower than the desired set level, reducing the cyclic ratio and resuming b). The program code can be run on a microcontroller.

DETAILED DESCRIPTION OF CERTAIN EMBODIMENTS

The following detailed description of certain embodiments presents various descriptions of specific embodiments of the invention. However, the invention can be embodied in a multitude of different ways as defined and covered by the claims.

In this description, reference is made to the drawings wherein like parts are designated with like numerals throughout.

The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

A principle of the circuit and method presented below is based on the fact that the intensity of the stimulus is directly related to the intensity of the electric current passing through the electrodes.

Measuring the intensity of the electric current is therefore the key that allows to check the quality of contact of the electrodes and also to adjust the intensity of the stimulus.

Method of Measurement and Electric Diagram

Measuring the electric current passing through the electrodes is not easy because:
the range of current to be accurately measured is very wide. Typically, currents between a few hundred µA and over 200 mA should be measured;
the stimulus current is of a pulsed nature.

Figure 1:
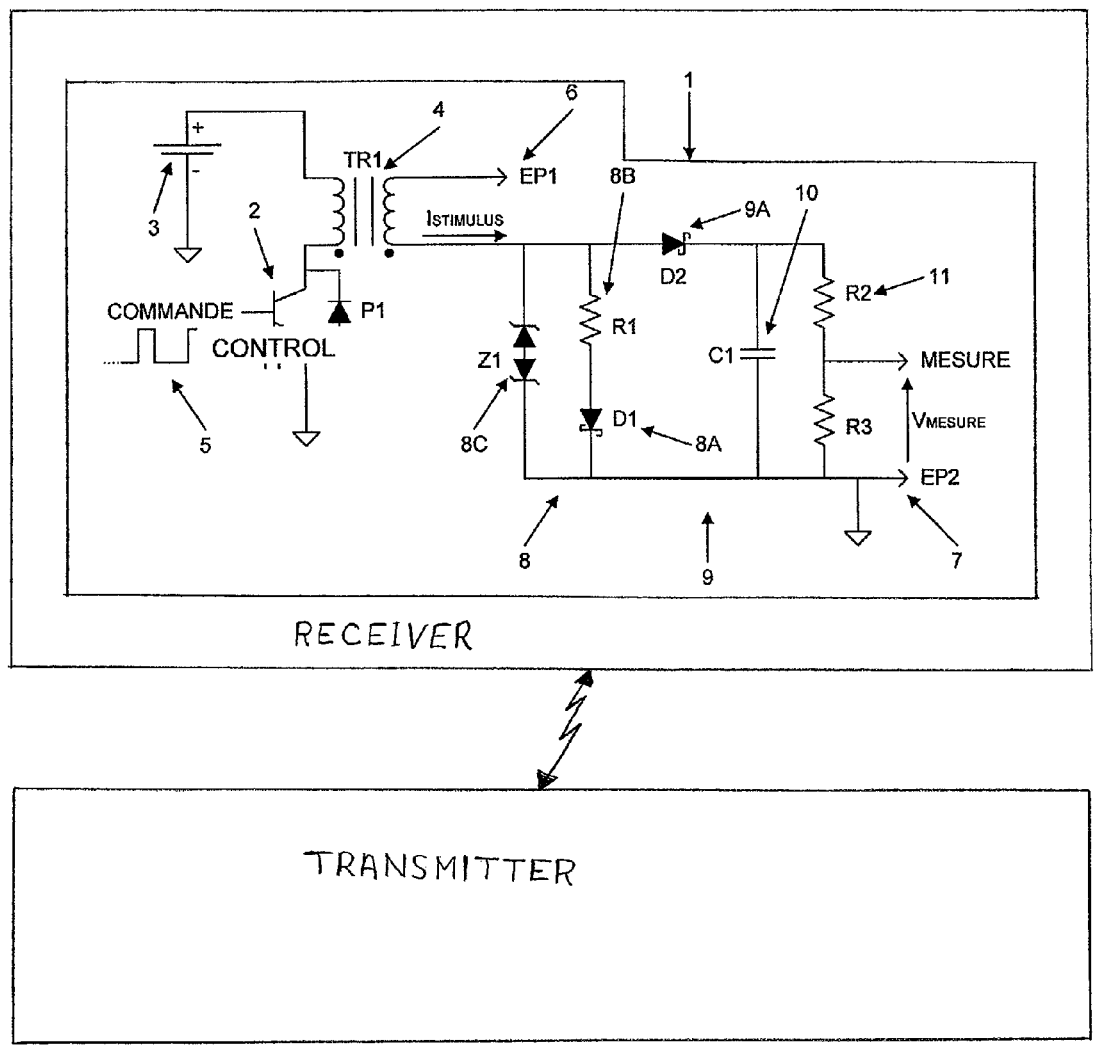
FIG. 1 is a diagram of an example circuit for measuring the intensity of the stimulus as in the present system and method.

An example circuit for measuring the current 1 is shown in FIG. 1. The circuit parts intended to generate high voltage and known from the state of the art are also shown to aid understanding.

A controlled switch 2 (transistor T1), an associated diode (P1) and a high-voltage transformer 4 (TR1) are responsible for generating the stimulus. The other components are intended to measure the current.

To explain the operation of the circuit for measuring the current, it is necessary to start by explaining the operation of the stimulus generation. The stimulus is generated by applying a signal PWM 5 (Pulse Width Modulation) based on transistor 2. This signal, which is responsible for the generation of the stimulus, is called hereafter a CONTROL signal. A microcontroller is an example of a component that may be used to generate the CONTROL signal. The PWM signal typically has a period of 1 ms and a cyclic ratio of 0 to 90%. The cyclic ratio is the ratio of the time during which T1 is conductive divided by the total time of the PWM cycle (1 ms).

Analyzing a PWM cycle shows that the transformer 4 (TR1) stores up energy while T1 is conducting (ON) and releases this energy when T1 is turned off (OFF). The release of this energy occurs through contact electrodes 6 (EP1) and 7 (EP2) connected to the secondary of the transformer TR1, which generates the stimulus. This type of operation is called "flyback" operation of the transformer 4 by those skilled in the art.

The presence of parasitic capacities (not shown) in the TR1 windings results in that the voltage at the electrode terminals is restricted to an upper terminal since these parasitic capacities absorb part of the energy provided by the transformer, even when no charge is created between the electrodes. It is therefore easy to understand that the higher the cyclic ratio, the higher the voltage at the electrode terminals.

The current $I_{STIMULUS}$ is measured by means of a non-linear shunt 8 and of a peak detector 9. The shunt 8 is formed by a limiter 8C (Z1), a resistor 8B (R1) and a forward-biased diode 8A (D1). The peak detector 9 is formed by a second forward-biased diode 9A (D2), a condenser 10 (C1) and a voltage divider 11 (R2 and R3).

The current $I_{STIMULUS}$ is the current that enters through the electrode 6 (EP1), passes through the transformer 4 and exits through the electrode 7 (EP2) connected to the earth, passing through the circuit for measuring the current. When the current $I_{STIMULUS}$ passes through R1 and D1, it creates a drop in voltage equal to $I_{STIMULUS}*R1+V_{D1}$ at the terminals of (R1, D1). $V_{D1}$ is the direct drop in voltage at the terminals of D1, the diode D1 preferably being a Schottky diode for which $V_{D1}$ is typically 0.4V.

The drop in voltage at the terminals of (R1, D1) is corrected by D2 which charges C1. The charging voltage is equal to the voltage at the terminals of (R1, D1) less the drop in voltage at the terminals of D2 ($V_{D2}$). This gives:

$$V_{C1}=I_{STIMULUS, PEAK}*R1+V_{D1}-V_{D2} \quad [I]$$

As $V_{D1} \approx V_{D2} \approx 0.4V$, $V_{C1} \approx I_{STIMULUS, PEAK}*R1$, with R1 of the order of 100Ω.

R2 and R3 are high-value resistors, typically several hundred kΩ, and form a dividing bridge which allows to obtain a potential of $V_{MEASUREMENT}$ within an acceptable range by a measurement device which is, for example, an analog-digital converter (ADC) incorporated into a microcontroller. R2 and R3 also act as slow-discharge resistors for C1.

This finally gives:

$$V_{MEASUREMENT}=I_{STIMULUS, PEAK}*R1*R3/(R2+R3) \quad [II]$$

It is therefore seen that the signal $V_{MEASUREMENT}$ is an almost continuous signal and that it is the direct image of the peak value of the stimulation current $I_{STIMULUS}$. As already mentioned, $V_{MEASUREMENT}$ can be measured by an ADC incorporated into a microcontroller.

It should finally be noted that Z1 (two Zener head-to-tail diodes) is a protection that limits the voltage at the terminals of (R1, D1) to typically 12V.

Algorithm for Measuring Electrode Contact

The circuit shown in FIG. 1 allows to measure whether the electrodes are in direct contact with the animal's skin without the latter being aware of this. To do this, the CONTROL signal is generated with a low cyclic ratio (typically 10%). The MEASUREMENT signal is measured. If the potential of the MEASUREMENT signal is greater than a given threshold ($V_{THRESHOLD}$), it means that a current $I_{STIMULUS}$ passes through the electrodes and that these electrodes are therefore in contact with the animal's skin.

Unfortunately, a cyclic ratio of 10% is not always suited to some specific circumstances:

when the animal's coat is damp, the passage of the current is favored. The animal feels the current as an annoying sensation, which is the opposite of the above-mentioned aim;

when the animal's coat is dense or thick, the current $I_{STIMULUS}$ is blocked by the animal's hair. In fact, this hair then forms a very fine insulating layer. $I_{STIMULUS}$ is considered as nil while the electrodes are almost in contact with the skin.

In the first case, a cyclic ratio of 5% for example should be used and in the second case a cyclic ratio of 20%. The algorithm presented below allows to solve this dilemma simply and effectively.

The algorithm consists in periodically carrying out a measurement cycle (typically every 5 seconds). This measurement cycle lasts a few hundred milliseconds. It consists in applying a CONTROL signal with a progressive cyclic ratio starting from 1% and typically limited to 20%. If, during this cycle, the potential of the MEASUREMENT signal ($V_{MEASUREMENT}$) exceeds $V_{THRESHOLD}$, the CONTROL signal is immediately interrupted and the system deduces that the contact is correct. If, on the other hand, the potential of the MEASUREMENT signal never exceeds $V_{THRESHOLD}$ during the measurement cycle, it means that the electrodes are really too far from the animal's skin and/or that the contact is incorrect or defective.

Figure 2:
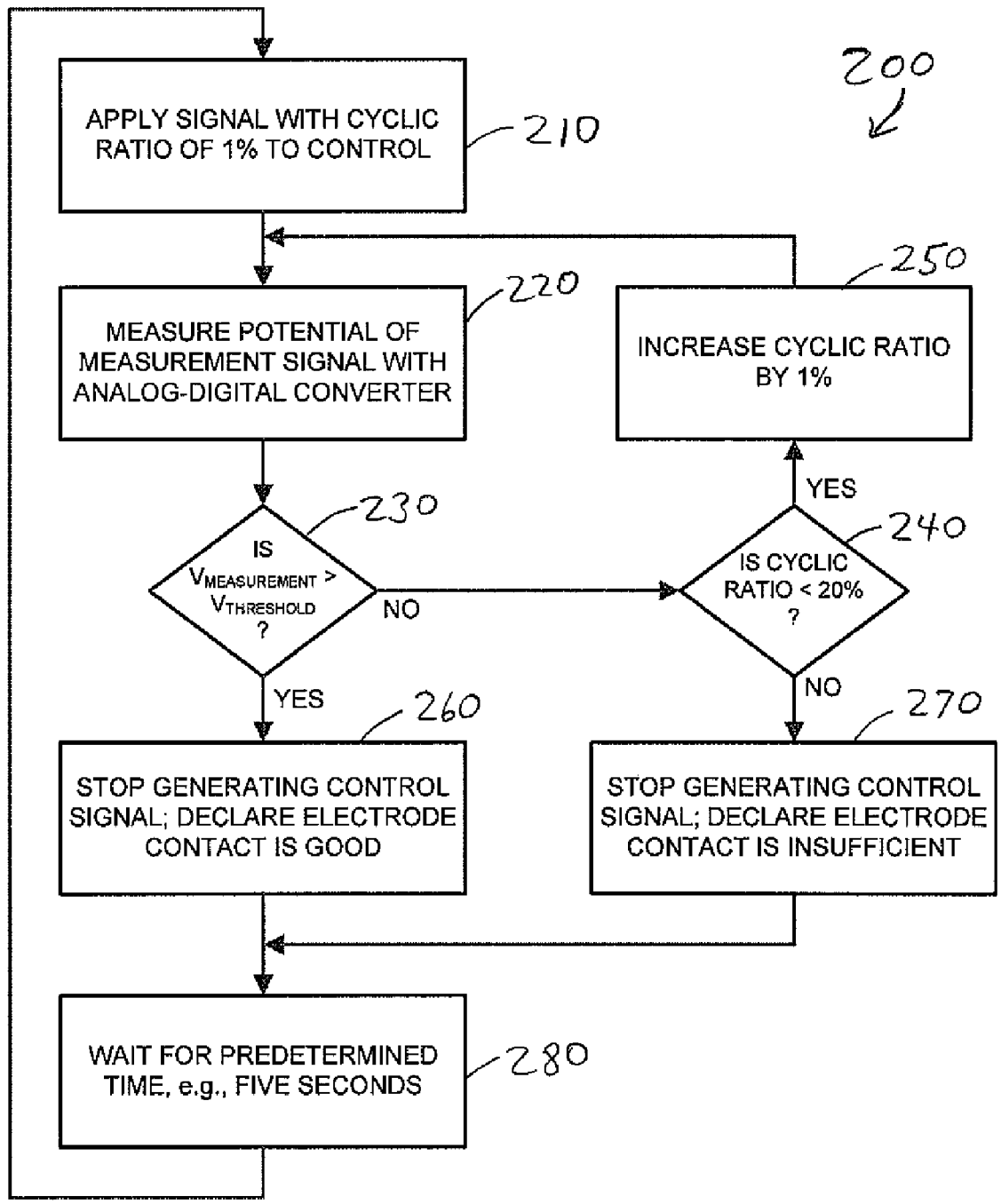
FIG. 2 is a flowchart of an example process for measuring electrode contact such as with the circuit of FIG. 1.

In the case where a microcontroller generates the CONTROL signal and measures the potential of the MEASUREMENT signal, an algorithm 200 may be summarized as follows in reference to FIG. 2:

1. Apply a signal with a cyclic ratio of 1% to CONTROL (state 210).
2. Measure the potential of the MEASUREMENT signal with the ADC (state 220).
    If $V_{MEASUREMENT}$ is greater than $V_{THRESHOLD}$ (decision state 230), go to stage 3. If not, if the cyclic ratio is lower than 20% (decision state 240), increase the cyclic ratio by 1% (state 250) and resume stage 2. Otherwise, go to stage 4.
3. Stop generating the CONTROL signal and declare that the electrode contact is good (state 260). Go to stage 5.
4. Stop generating the CONTROL signal and declare that the electrode contact is insufficient (state 270). Go to stage 5.
5. After a predetermined time, e.g., five second wait (state 280), go to stage 1.

This algorithm thus allows to adjust the cyclic ratio as a function of possible obstacles such as hair located between the electrodes and the animal's skin, while avoiding to apply an excessively high cyclic ratio when there is no obstacle and/or when the animal's skin is damp.

Control of the Stimulus Current

As mentioned in the introduction, the stimulus is of variable intensity. In the state of the art, this consists in using different cyclic ratios depending on the desired stimulus intensities. Unfortunately, this technique has the major drawback that the effective intensity of the stimulus felt by the animal greatly depends on the quality of contact of the electrodes. Thus, for a cyclic ratio of 50%, an animal with a dense and dry coat will barely feel the stimulus whereas an animal with a damp coat will feel a painful sensation.

The presented circuit allows to solve this problem by producing feedback on the $I_{STIMULUS}$ measurement.

Figure 3:
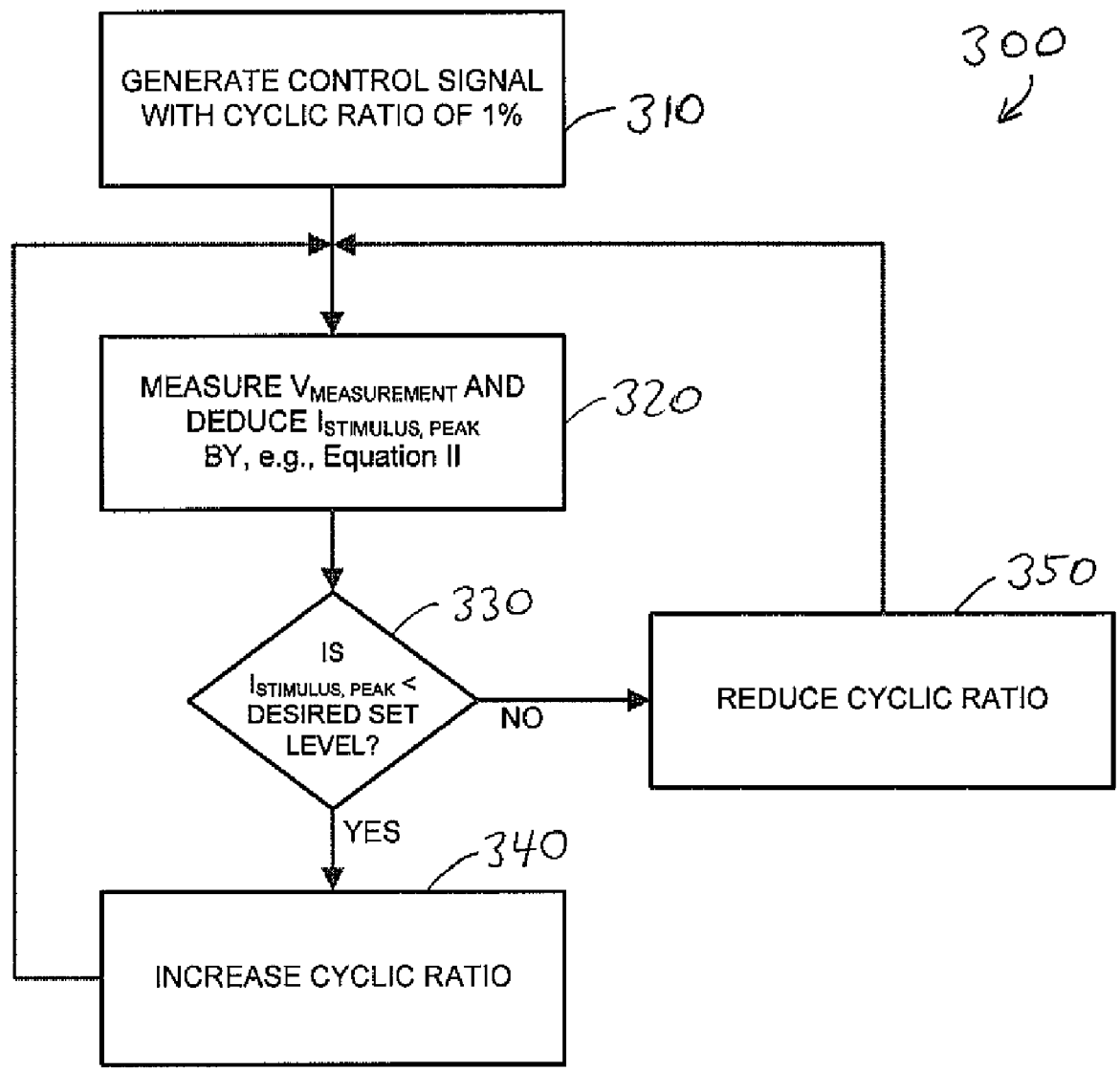
FIG. 3 is a flowchart of an example process for measuring and control of stimulus current such as with the circuit of FIG. 1.

An algorithm 300 for adapting the cyclic ratio using the circuit for measuring the current follows in reference to FIG. 3:

1. Generate the CONTROL signal with a cyclic ratio of 1% (state 310).
2. Measure $V_{MEASUREMENT}$ and deduce $I_{STIMULUS, PEAK}$ from it with equation II (state 320).
3. If $I_{STIMULUS, PEAK}$ is lower than the desired set level (decision state 330), increase the cyclic ratio (state 340) and return to stage 2. Otherwise, reduce the cyclic ratio (state 350) and return to stage 2.

This algorithm is a regulatory algorithm that uses the circuit of FIG. 1 to measure and control the intensity of the stimulus.

The circuit and method comprises numerous advantages compared with the state of the art, such as:

measurement of the quality of contact of the electrode with the animal's skin without the latter being aware of it;

automatic adjustment of the stimulus depending on the impedance level between the electrodes (application of adequate stimulus even if the impedance is very high, no unnecessary suffering for the animal as a result of excessive amplitude of the stimulus if the coat is damp);

possibility to work in bidirectional RF communication or not, with the use of automatic configuration, the use of the bidirectional mode more than significantly increasing the performance of the collar (information on the state of the battery, information on the quality of contact of the electrode, information on the intensity of the actual stimulus, automatic selection of channels and sub-channels, more efficient management of the energy provided by the batteries, etc.);

opportunity to activate or stop the punishment to maximize reactivity without risk of interruption.

The above-described methods or algorithms may be realized in a program format to be stored on a computer readable recording medium that includes any kinds of recording devices for storing computer readable data, for example, a CD-ROM, a DVD, a magnetic tape, memory card and a disk, and may also be realized in a carrier wave format (e.g., Internet transmission or Bluetooth transmission). The programs can be performed by the microcontroller or other computing device.

CONCLUSION

While specific blocks, sections, devices, functions and modules may have been set forth above, a skilled technologist will realize that there are many ways to partition the system, and that there are many parts, components, modules or functions that may be substituted for those listed above.

While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the invention.

What is claimed is:

1. A remote receiving circuit for providing and controlling an electric stimulus applied to an animal, the circuit comprising:
   an electronic switch powered by a battery in series on a primary of a high-voltage transformer and whose on/off state can be modified by control pulses to create a source of alternating current to supply the primary of the transformer;
   a first electrode and a second electrode configured to be in contact with the animal and connected to the respective ends of a secondary of the transformer; and
   a peak current measuring device situated between one end of the secondary of the transformer and one of the electrodes in contact with the animal, wherein a stimulus current is applied by the electrodes to the animal's body, wherein the peak current measuring device comprises a non-linear shunt and peak detector.

2. The circuit as in claim 1, wherein the electronic switch is a power transistor whose base is powered by control pulses modulated in terms of pulse width (PWM), the high-voltage transformer operating in a flyback mode.

3. The circuit as in claim 1, wherein the control pulses are generated remotely or by a microcontroller belonging to the circuit.

4. The circuit as in claim 3, wherein the microcontroller comprises an analog-digital converter, wherein the analog-digital converter measures a voltage in a peak detector portion of the device.

5. The circuit as in claim 4, wherein the microcontroller is configured to adjust the generation of control pulses to the measurement of peak current.

6. The circuit as in claim 1, wherein, in parallel between the end of the transformer secondary opposite the end connected to the first electrode and the second electrode, the non-linear shunt comprises a first forward-biased diode in series with a resistor R1 so as to create a drop in voltage and a pair of Zener diodes in a head-to-tail arrangement to limit this drop in voltage.

7. The circuit as in claim 6, wherein the peak detector comprises a second forward-biased diode connected to the resistor R1 and connected to a condenser in parallel on a voltage divider with two resistors in series R2 and R3.

8. The circuit as in claim 7, wherein the first and second forward-biased diodes are Schottky diodes.

9. The circuit as in claim 7, wherein the peak intensity of the stimulus current is given by the equation:

$$V_{MEASUREMENT} = I_{STIMULUS, PEAK} * R1 * R3 / (R2 + R3),$$

where $V_{MEASUREMENT}$ is the voltage measured at the exit from the voltage divider.

10. The circuit as in claim 1, further comprising an animal training collar having the remote receiving circuit.

11. The circuit as in claim 1, additionally comprising means to adjust the intensity of the stimulus applied to the animal to the measurement of the peak intensity of the stimulus current.

12. A device for remotely providing and controlling an electric stimulus applied to an animal, the device comprising:
   a radio frequency transmitter configured to emit a remote signal;
   a receiver circuit as in claim 1 configured so as to receive the signal and to provide and control the stimulus depending on the signal received.

13. The device as in claim 12, wherein the transmitter and the receiving circuit are both transmitters/receivers and wherein the communication is bidirectional.

14. The device as in claim 13, wherein the transmitter receives information on the intensity of the stimulus applied, on the quality of contact of the electrodes with the animal and on the state of charge of the battery.

15. The device as in claim 13, wherein the transmitter automatically selects communication channels and sub-channels and uses codes of variable size.

16. A remote receiving circuit for providing and controlling an electric stimulus applied to an animal, the circuit comprising:
   an electronic switch powered by a battery in series on a primary of a high-voltage transformer and whose on/off state can be modified by control pulses to create a source of alternating current to supply the primary of the transformer;
   a first electrode and a second electrode configured to be in contact with the animal and connected to the respective ends of a secondary of the transformer; and
   a device for measuring a peak intensity of a stimulus current applied by the electrodes to the animal's body, wherein the device for measuring the peak intensity of the stimulus current comprises a non-linear shunt and a peak detector, and wherein, in parallel between the end of the transformer secondary opposite the end connected to the first electrode and the second electrode, the non-linear shunt comprises a first forward-biased diode in series with a resistor R1 so as to create a drop in voltage and a pair of Zener diodes in a head-to-tail arrangement to limit this drop in voltage.

17. The circuit as in claim 16, wherein the control pulses are generated remotely or by a microcontroller belonging to the circuit.

18. The circuit as in claim 17, wherein the microcontroller comprises an analog-digital converter for measuring peak current.

19. The circuit as in claim 16, additionally comprising means to adjust the intensity of the stimulus applied to the animal to the measurement of the peak intensity of the stimulus current.

* * * * *